United States Patent [19]

Balash et al.

[11] 3,802,315

[45] Apr. 9, 1974

[54] CRADLE OF A CIRCULAR-TOOTH BEVEL GEAR CUTTING MACHINE

[76] Inventors: Eduard Alexandrovich Balash, Stroiploschadka ZZS, dom 31, kv. 21; Vladimir Georgievich Smolyaninov, ulitsa Oktyabrskaya, 12, kv. 5, both of Saratov, U.S.S.R.

[22] Filed: Mar. 22, 1972

[21] Appl. No.: 237,081

[52] U.S. Cl. .......................................... 90/5, 90/9.4
[51] Int. Cl. ................................................ B23f 9/10
[58] Field of Search ........................... 90/3, 5, 9, 9.4

[56] References Cited
UNITED STATES PATENTS

| | | | |
|---|---|---|---|
| 3,009,397 | 11/1961 | Picanol | 90/5 |
| 3,044,365 | 7/1962 | Picanol | 90/5 |
| 3,357,307 | 12/1967 | Picanol | 90/5 |

FOREIGN PATENTS OR APPLICATIONS

| | | | |
|---|---|---|---|
| 168,975 | 0/1965 | U.S.S.R. | 90/3 |

*Primary Examiner*—Donald R. Schran

[57] ABSTRACT

The means for carrying the cutter spindle which has an adjustable tilt angle relative to the cradle oscillation axis, and is mounted on an intermediate plate so as to allow for normal adjustment movements to the bore axis of the rotary drum of the cradle, and for radial displacement of the spindle with respect to the axis.

2 Claims, 5 Drawing Figures

CRADLE OF A CIRCULAR-TOOTH BEVEL GEAR CUTTING MACHINE

BACKGROUND OF THE INVENTION

The invention relates to gear cutting machines, and more particularly to cradles of machines for cutting bevel gears having circular teeth.

Cradles for spiral-bevel and hypoid gear cutting machine are known in the art which have an inclined bore in its housing whose axis intersects with the axis of oscillation of the cradle at a point coinciding with the apex of an imaginary generating gear, in which bore there is placed a rotary drum (a swash plate) having a bore with an axis passing through said point to accommodate an intermediate rotary plate (a swivel) whereupon the means for carrying the cutter spindle whose axis is parallel to the axis of the bore of the rotary drum is mounted (see FRG Patent No.1115104 or Swiss Patent No.348856).

In this known cradle, the means for carrying the cutter spindle is made as an eccentric cylinder which is rotatable within the bore of an intermediate plate, the axis of that bore being parallel to the bore axis of the rotary drum, and, in turn, has a bore to accommodate the cutter spindle, the axis of the latter bore being parallel to the bore axis of the intermediate plate and coinciding with the axis of the spindle rotation.

By turning the eccentric cylinder, the cutter spindle is radially shifted relative to the bore axis of the intermediate plate.

The radial displacement of the spindle has an adjustment movement, and it is required that the cutter be set into a definite position with respect to the bevel gear being generated.

The adjusting displacements are those realized in order to attain correct mutual orientation of the cutter and the workpiece. They are usually done manually. A shiftable adjusting element is fixed in place after reaching its required position, and remains immovable during the process of operation.

It is well known that the accuracy and mutual location of the cutter and the workpiece affects the eventual accuracy of the product, particularly with the disposition of the tooth face and its shape, and in the case where the interaction of the gear worked with a mating wheel affects the location and shape of the area of contact, which is one of the criteria in evaluating the gearing quality.

In the previously known cradle, the accuracy of the radial displacement of the cutter spindle, which is done by turning the eccentric cylinder, depends on the quality of construction and accuracy of the eccentricities of the bores in the eccentric cylinder and in the intermediate plate.

The disadvantage of the known cradle consists in the fact that it is technologically difficult to obtain exact and equal values for the eccentricities of the bores in the said parts, which in turn complicates the alignment of the cutter spindle axis with respect to the oscillation axis of the cradle at the zero position, the latter alignment being a criterion for evaluating the accuracy of the cradle.

This disadvantage causes errors in the relative disposition of the cutter and the workpiece, and hence reduces the precission of the product.

Besides that, a radial displacement of the cutter spindle in the known cradle caused by turning the eccentric cylinder involves complicated machine setting calculations, since a variation in the radial shift is accompanied by a simultaneous variation in the angular position of the cutter spindle relative to the oscillatory axis of the cradle.

SUMMARY OF THE INVENTION

It is an object of the present invention to eliminate the aforementioned disadvantages.

An important object of the present invention is to provide a cradle for a circular-tooth bevel gear cutting machine that would reduced the radial displacement of the cutter spindle relative to the bore axis of the rotary drum so as to provide greater accuracy as compared to the known cradles of the same type.

Another important object of the present invention is to design the cradle so that would simplify the setting calculations machine.

With these and other objects in view, in the proposed cradle for a circular-tooth bevel gear cutting machine, the means for carrying the cutter spindle is, according to the invention, mounted on the intermediate plate having the possibility for adjusting movements in a direction perpendicular to the bore axis of the rotary drum for radial displacement of the cutter spindle relative to this axis.

Rather advantageously, the means carrying the cutter spindle should be made in the form of a carriage which is mounted in guides located on the intermediate plate normal to the bore axis of the rotary drum which and has a bore whose axis coincides with the axis of rotation of the cutter spindle, and accommodating this spindle with a sleeve in which it rotates and also having together therewith the means for an axial displacement adjustment relative to the carriage.

The axial displacement adjustment means for the sleeve with the cutter spindle relative to the carriage should advisably be designed a a rack gear whose toothed rack has a side bevelled face and is attached to the sleeve, while rigidly fixing the sleeve with the spindle on the carriage in a chosen position by a wedge clamp acting on the bevelled surface on the side of the toothed rack.

Due to such a design for the proposed cradle, the radial displacement of the cutter spindle relative to the bore axis of the rotary drum is performed along a straight line without changing the angular position of the spindle axis relative to the axis of oscillation of the cradle, thus permitting simpler machine setting calculations.

BRIEF DESCRIPTION OF THE DRAWINGS

The invention is further exemplified with the illustrative embodiments thereof shown in the appended drawings, wherein.

DETAILED DESCRIPTION OF THE PREFERRED EMBODIMENT

Figure 1:
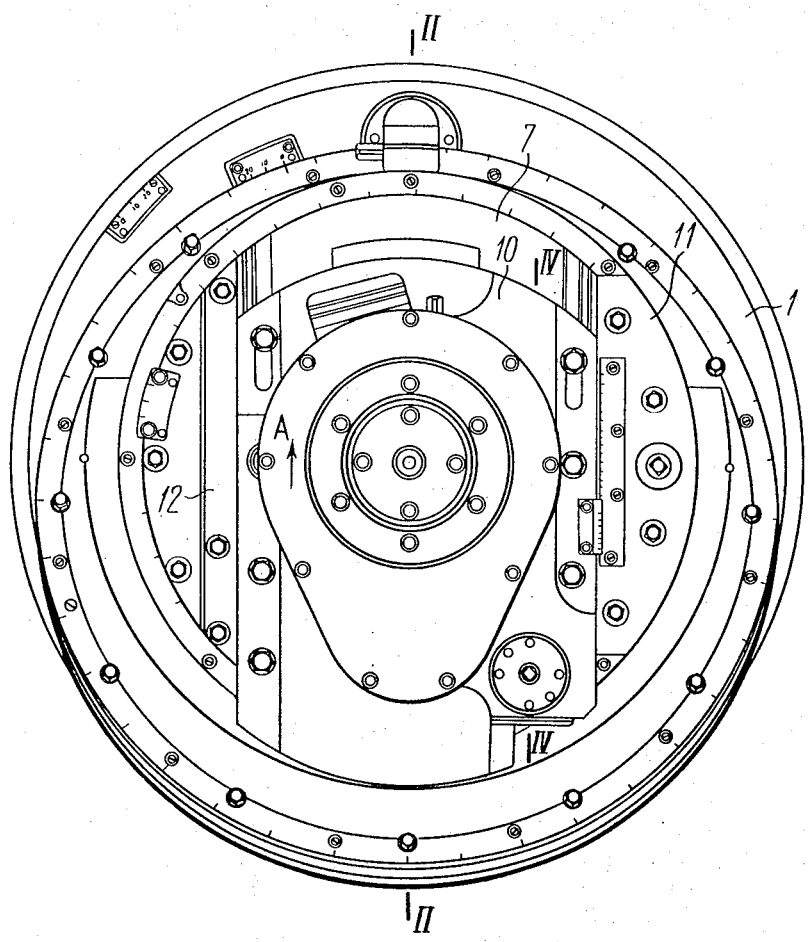
FIG. 1 shows the cradle of the circular-tooth bevel gear cutting machine according to the invention (front view, zero position)

Proposed herein is a cradle for cutting bevel gears having circular teeth, whose housing 1 (FIG.1) is mounted in a pillar 2 (FIG.2) of the machine. In the housing one there is an inclined bore with an axis 3 intersecting the cradle oscillation axis 4 in a point 0 that coincides with the pitch cone apex of an imaginary generating gear. Also the inclined bore of housing 1 resides a rotary drum 5 which has, in its turn, a bore with an axis 6 passing through said point 0, which accommodates an intermediate plate 7 whereon a means for carrying the cutter spindle 8 is mounted. The rotation axis 9 (FIGS.2 and 3) of this spindle is parallel to axis 6 of the bore of the rotary drum 5, and coincides therewith in the zero position.

According to the invention, the means for carrying the cutter spindle 8 is mounted on the intermediate plate 7 with a provision for adjusting the movement in the direction of arrow A (FIG.1) normally toward the bore of axis 6 (FIG.2) of the rotary drum 5 for radial displacement of the cutter spindle 8 relative to said axis 6.

It is most advantageous to make the means for carrying the cutter spindle 8 in the form of a carriage 10 (FIGS 1 and 2) housed in guides 11 and 12 (FIG.1) extending along the plane of the intermediate plate 7 normally to the bore axis 6 of the rotary drum 5.

Figure 2:
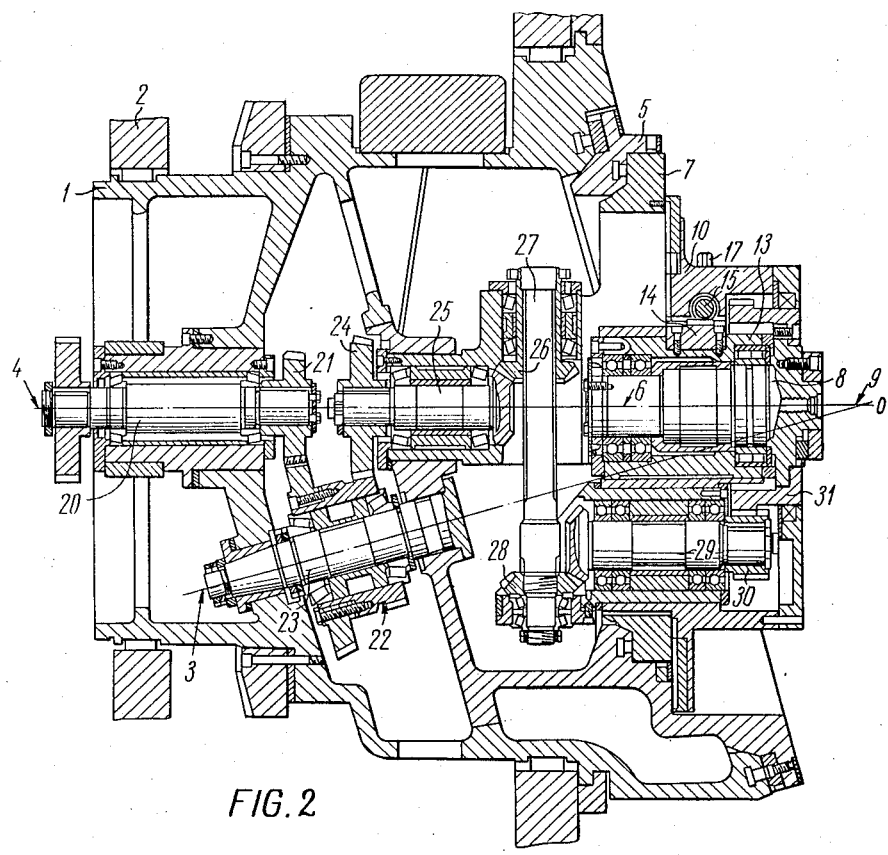
FIG. 2 is section II—II in FIG.1.
Figure 3:
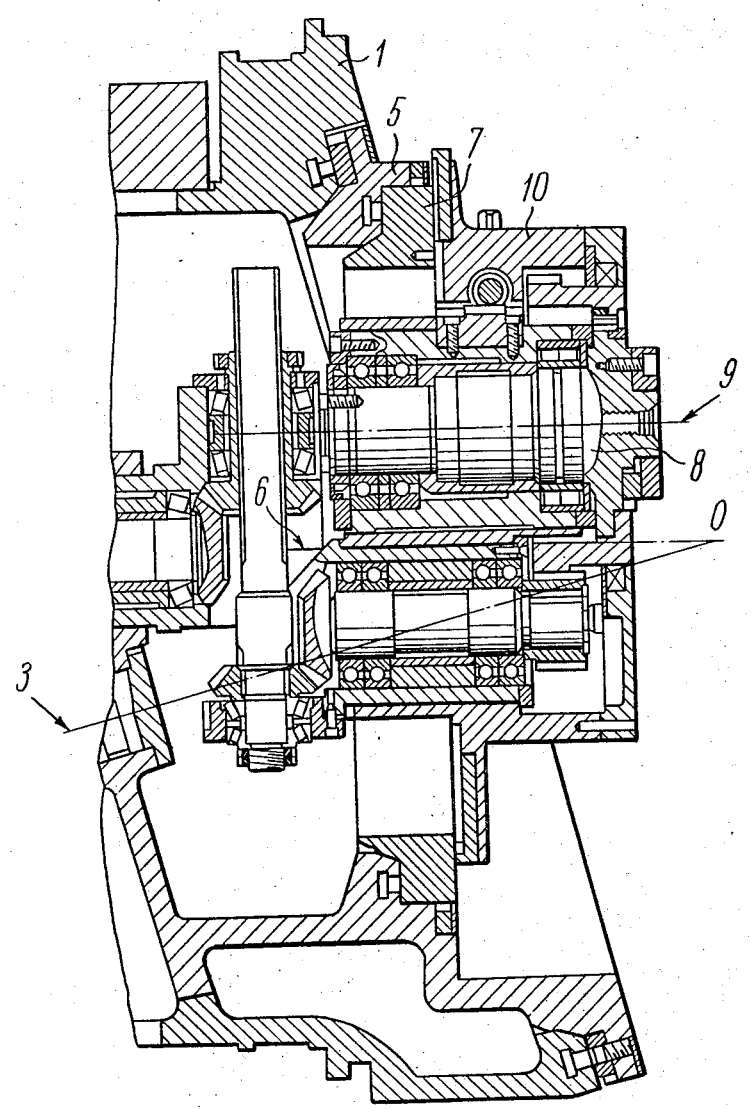
FIG.3 — same, the cutter spindle being radially displaced relative to the bore axis of the rotary drum (longitudinal section partially cutaway)
Figure 5:
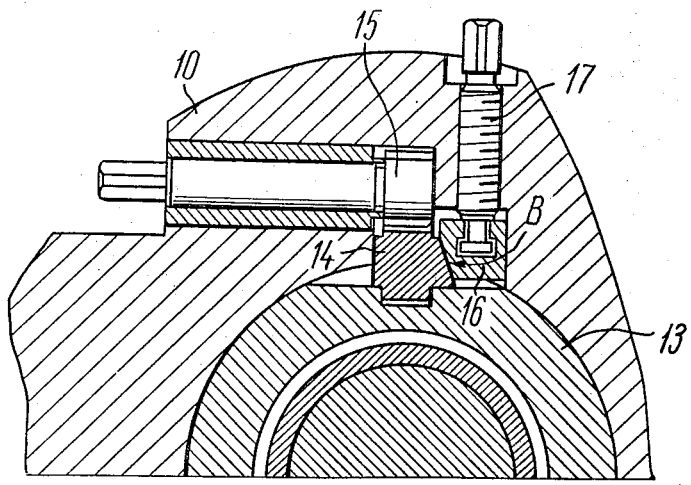
FIG.5 is section V—V in FIG.2 (enlarged).

Carriage 10 has a bore whose axis coincides with the rotation axis 9 of the cutter spindle 8 which accommodate therein the spindle 8 with a sleeve 13 (FIGS 2 and 5). Spindle 8 rotates in this sleeve and is capable of axial movement, together therewith, relative to carriage 10.

A toothed rack 14 (FIGS. 2 and 5) is secured to sleeve 13 which has a bevelled surface B on one side which meshes with a gear 15 mounted in carriage 10. This rack gearing effects the axial adjustment displacements of the sleeve with the spindle relative to the carriage.

In order to fit sleeve 13 with spindle 8 on carriage 10 in the required position, a wedge clamp 16 (FIG.5) is provided whose side bevel acts on the bevelled surface B of rack 14. A screw 17 serves to move the wedge clamp 16.

The axial adjustment displacement of sleeve 13 with spindle 8 is necessary for matching the plane of the cutter tips of the cutter head (not shown) with point 0 coinciding with the apex of the generating gear.

Figure 4:
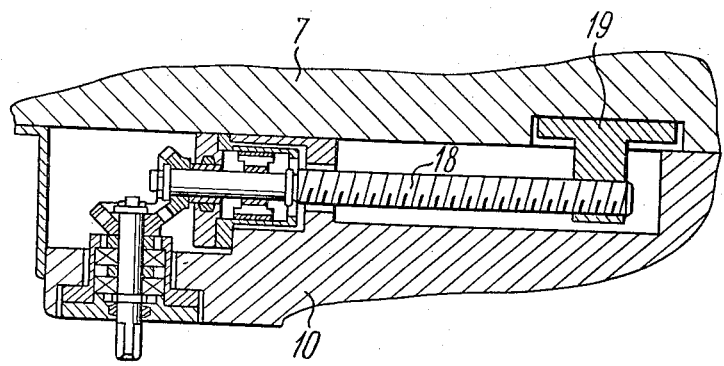
FIG.4 is section IV—IV in FIG.1 (enlarged)

Carriage 10 is moved along guides 11, 12 by means of a screw 18 (FIG.4) mounted therein and a nut 19 secured on the intermediate plate 7. Thus, the carriage with the cutter spindle moves along a straight line in the guides of the intermediate plate 7, which secures the rectilinear radial displacement of the cutter spindle 8 relative to the bore axis 6 of drum 5. This, in turn, retains the angular position of the rotation axis 9 of the cutter spindle 8 relative to the oscillation axis 4 of the cradle, thus simplifying the calculation for the machine settings.

Other adjustments are also provided for the movements required to secure the specified position of the cutter with respect to the workpiece, such as the turn of the rotary drum 5 about axis 3 of the inclined bore in housing 1 in any direction so as to attain the preset tilt angle of the cutter spindle 8 relative to the cradle oscillation axis 4, and the turn of the intermediate plate 7 about the bore axis 6 of the rotary drum 5 in any direction so as to orient the tilted cutter with respect to the workpiece.

The arrangements for turning and fixing the rotary drum 5 and the intermediate plate 7 can be of any known and suitable type serving for this purpose, and are therefore not disclosed in the present description so as not to obscure the main idea of the invention.

The cradle operates as follows.

Rotation is transmitted to the cutter spindle 8 its drive in any position of the cradle adjusting elements.

Any known suitable means can be employed to transmit the rotation to the cutter spindle 8. In the present embodiment, rotation is transmitted through a shaft 20 (FIG.2) and a bevel gear 21 seated thereon, and a cluster bevel gear 22 rotating on an axle 23 secured in the rotary drum 5 and then to a bevel gear 24 mounted on a pinion shaft 25. Further, rotation is transmitted to a bevel gear 26 which goes through a movable spline joint connected to a shaft 27. Fixed on the end of a bevel gear 28 is fixed on the end of shaft 27 which transmits rotation to a pinion shaft 29, and then to a spur gear 30 seated thereon, and finally, to the cutter spindle 8 through a spur gear 31 mounted thereon.

Thereupon the cradle operates in the known way commonly characteristic of machines for cutting bevel gears having circular teeth.

What we claim is:

1. A cradle of a circular-tooth bevel gear cutting machine, said cradle comprising:
   a housing;
   a drum rotably mounted in said housing and having an axis of rotation which is inclined to the axis of oscillation of said housing and intersects the latter axis at a point coinciding with the apex of a cone of an imaginary generating gear;
   an intermediate plate turnably mounted in said drum and having an axis which is inclined to the axis of said drum, the axis of said plate passing through said point and at a zero position of said drum which coincides with the axis of oscillation of said housing;
   a cutter spindle having an axis of rotation parellel to the axis of said plate;
   means mounted on said plate for carrying said spindle with the capability of adjusting its movement in the direction normal to the axis of said plate for radial displacement of said spindle relative to said axis; and
   said means for carrying said spindle comprising guides disposed on said plate normal to the axis thereof, a carriage mounted in said guides and having a bore with the axis coinciding with the axis of rotation of said spindle, and a sleeve disposed in said bore of said carriage, said spindle being disposed in said sleeve to be rotable therewith and with which it is capable of adjustment axial displacement with respect to said carriage.

2. A cradle as claimed in claim 1, wherein the adjustment axial displacement of said sleeve and said cutter spindle relative to said carriage is effected through a rack gearing, the rack of said gearing having a side bevelled face and being attached to said sleeve, while rigidly fixing of said sleeve with said spindle in a chosen position on said carriage is achieved by a wedge clamp acting on said side bevelled face of the rack.

* * * * *